United States Patent
Phillips et al.

[11] Patent Number: 5,925,745
[45] Date of Patent: Jul. 20, 1999

[54] REACTIVE DYES CONTAINING A PERMANENT QUATERNARY AMMONIUM GROUP

[75] Inventors: Thomas S. Phillips, North Providence; Ralph Svenningsen, Coventry, both of R.I.; Ronald P. Pedemonte, Eppstein-Vockenhausen, Germany

[73] Assignee: Dystar, L.P., Charlotte, N.C.

[21] Appl. No.: 09/075,569

[22] Filed: May 11, 1998

Related U.S. Application Data

[63] Continuation-in-part of application No. 08/823,926, Mar. 25, 1997, abandoned.

[51] Int. Cl.$^6$ .......................... C09B 62/002; C09B 62/04; C09B 62/503

[52] U.S. Cl. .......................... 534/604; 534/605; 534/606; 534/612; 540/126; 544/76

[58] Field of Search ..................... 534/604, 605, 534/606, 612

[56] References Cited

U.S. PATENT DOCUMENTS

| | | | |
|---|---|---|---|
| 4,333,874 | 6/1982 | Nickel et al. | 534/603 |
| 4,676,803 | 6/1987 | Harms et al. | 534/604 X |
| 4,820,806 | 4/1989 | Baumann et al. | 534/604 X |
| 4,839,468 | 6/1989 | Nickel et al. | 534/604 |
| 4,865,990 | 9/1989 | Stead et al. | 435/803 |
| 4,975,118 | 12/1990 | Mayer et al. | 534/604 |
| 5,019,165 | 5/1991 | Bruder et al. | 106/31.48 |

FOREIGN PATENT DOCUMENTS

| | | |
|---|---|---|
| 59355 | 9/1982 | European Pat. Off. |
| 516298 | 12/1992 | European Pat. Off. |
| 59-202263 | 11/1984 | Japan |
| 1-156582 | 6/1989 | Japan |

OTHER PUBLICATIONS

Burton, "The Interaction of C.I. Reactive Blue 2 Analogues Bearing Terminal Ring Modifications With Horse Liver Alcohol Dehydrogenase", Journal of Chromatography, 455 (1988) pp. 201–216.

Mitsubishi Chemical Industries, Chemical Abstracts, 102:133548 (1985).

*Primary Examiner*—Fiona T. Powers
*Attorney, Agent, or Firm*—Connolly & Hutz

[57] ABSTRACT

A fiber-reactive dye corresponding to formula (1)

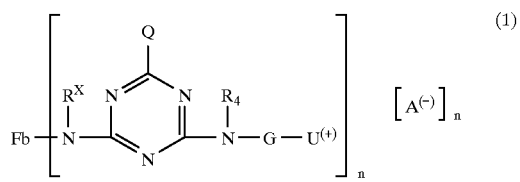

in which:

Fb is the radical of an azo dye, of a heavy metal complex azo dye, of a formazan dye, of a triphenodioxazine dye or of a phthalocyanine dye;

$U^{(+)}$ is a permanent quaternary ammonium group;

$A^{(-)}$ is a colorless anion, and $R^x$, $R_4$, G, Q and n are as defined in the specification, with the proviso that the dye contains at least one group of the vinylsulfone series, such as a group of the formula —$SO_2Y$, wherein Y is as defined in the specification, these dyes being capable of dyeing hydroxy- and/or carboxamido-containing fibres, such as cellulosic fibre and wool.

16 Claims, No Drawings

REACTIVE DYES CONTAINING A PERMANENT QUATERNARY AMMONIUM GROUP

This is a continuation-in-part application of U.S. patent application Ser. No. 08/823,926 filed Mar. 25, 1997, now abandoned, which is incorporated by reference in its entirety for all purposes.

This invention is on the field of fiber-reactive dyes suitable for the use in low and no salt dyebaths.

Fiber reactive dyes form a chemical bond with the fiber being colored, and because of this are generally considered to possess excellent fastness properties. The present invention can be used with several classes of fiber reactive dyes. The largest class of fiber reactive dyes are azo dyes which containing one or more azo groups (N=N). The fiber reactive azo dyes are generally prepared by the chemical reaction, between a diazo component and a coupling component, referred to as a coupling reaction.

Closely related to the metal complexes of azo dyes are the formazans, which are conveniently synthesized from aryl hydrazones by azo coupling with diazonium salts. Copper complexes of formazans are technically the most important class of fiber-reactive formazans.

Phthalocyanines are a group of green and blue dyes formed by condensation polymerization of four molecules of phthalonitrile with one atom of a metal, e.g. copper phthalocyanine. Phthalocyanines are also available in a number of shades from deep blue-green to a bright green with only a slight blue tone. Triphenodioxazine dyes yield brilliant blue dyeings with high color strength. The dyes are obtained from the condensation of aromatic amines with tetrachlorobenzoquinone in the presence of a base. The condensation products are then cyclized in a solvent or acidic medium in the presence of an oxidizing agent.

Fiber reactive dyes contain one or more groups which, in the dyeing process, leave the dye molecule creating leaving a reactive site, so that the dye can bond with the substrate which is being dyed. The group which leaves the dye during the dyeing process is called a leaving group. Thus, a leaving group is defined as a moiety that leaves the dye molecule during the dyeing process, creating a reactive site. In most cases, these leaving groups have been halogens such as chlorine or fluorine, however a quaternary ammonium also works as a leaving group. While dyes are known that incorporate the quaternary ammonium, see, e.g. EPO Patent Application Publication No. 0 516 298 A1, these substituents have been limited to the leaving group.

Competitive and environmental concerns have lead to increased requirements being imposed on the use of reactive dyestuffs. Today, not only the quality of dyed product, but also the efficiency and environmental impact of the dyeing process have come under scrutiny. Dye properties of interest include: fastness, the ability of a color to remain unchanged when exposed to a specified agency including light, rubbing and washing, the ability of a color to remain unchanged when exposed to abrasion and/or soaps and detergents; and fixing, a process of setting a dye. One measure of the intensity of a color is the color density unit (CDU). With fiber reactive dyes it has been possible to increase the intensity of the color obtained by a dyebath by addition of salt. However, the use of salt increase the cost of the dyebath, and increases the toxicity of the dyebath. Discharge from a spent saltcontaining dyebath has the potential to harm beneficial bacteria in rivers and lakes. Therefore the search continues for a new fiber reactive dye which possess good color fastness, good color yield, and are environmentally advantageous in that they may be used with low or no salt dyebaths.

With the present invention fiber-reactive dyes corresponding to general formula (1) have been found, the quaternary ammonium group $U^{(+)}$ of which facilitates the use of the dyes in low- or no-salt dyebaths.

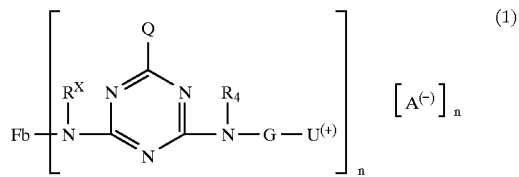

in which:

Fb is the radical of an azo dye, of a heavy metal complex azo dye, of a formazan dye, of a triphenodioxazine dye or of a phthalocyanine dye;

n is 1 or 2, preferably 1;

$R^x$ is hydrogen, alkyl of 1 to 4 carbon atoms, unsubstituted or substituted by halogen, hydroxy, cyano, alkoxy of 1 to 4 carbon atoms, alkoxycarbonyl of 2 to 5 carbon atoms, carboxy, sulfamoyl, sulfo or sulfato;

$R_4$ has one of the meanings of $R^x$;

G is an aromatic group, such as phenylene unsubstituted or substituted by sulfo, methyl, ethyl, methoxy or ethoxy, or is an acyclic aliphatic group of 1 to 6 carbon atoms or alicyclic group of 5 to 8 carbon atoms, such as cyclohexylene, the alkylene chains may be interrupted by one or more hetero groups, such as O, S, NH, $SO_2$, CO, CO—NH or NH—CO;

$U^{(+)}$ is a permanent quaternary ammonium group;

Q is fluorine, chlorine, bromine, cyanoamino, pyridino, carboxypyridino, carbamoylpyridino or a group of the general formula (2a) or (2b)

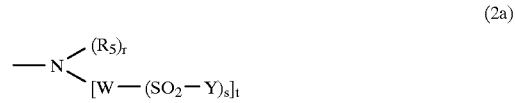

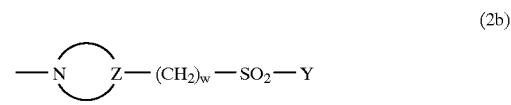

in which $R_5$ is hydrogen, alkyl of 1 to 4 carbon atoms, alkoxy of 1 to 4 carbon atoms, phenyl or cyclohexyl, W is substituted or unsubstituted arylene, alkylene or alkylene-arylene, wherein the alkylene groups being preferably of 1 to 4 carbon atoms or of 2 to 6 carbon atoms, if interrupted by a hetero group, such as O, S, NH, $SO_2$, CO, CO—NH or NH—CO, arylene being preferably phenylene or naphthylene, the substituents of phenylene being preferably 1 or 2 substituents selected from the group consisting of alkyl of 1 to 4 carbon atoms, such as methyl and ethyl, alkoxy of 1 to 4 carbon atoms, such as methoxy and ethoxy, carboxy, sulfo and chlorine, in particular thereof methyl, ethyl, methoxy and ethoxy, and the substituents of naphthylene being preferably 1 or 2 sulfo groups, and the alkylene moieties being preferably those of 1 to 6 carbon atoms, in particular of 1 to 3 carbon atoms, such as methylene, ethylene and n-propylene, Y is vinyl, or is ethyl substituted in the β-position by a substituent which is eliminated by the action of an alkaline agent, such as halogen, for ex. chlorine or bromine, sulfato, thiosulfato, phosphate, alkanoyloxy of 2 to 5 carbon atoms, such as acetyloxy, benzoyloxy, sulfobenzoyloxy or p-toluene sulfonyloxy, preferably sulfato and chlorine, Z is nitrogen or CH and forms together with the N atom a bivalent ring consisting of 1 or 2 alkylene groups having 1 to 5 carbons and optionally 1 to 2 hetero groups, such as O and NH, r is zero or 1, s is 1 or2, t is 1 or 2, and w is 1,2or3;

$A^{(-)}$ is a colorless anion, such as a hydroxyl anion, a chloride anion, a hydrogenosulfate anion, an acetate anion, a borate anion or the molar equivalent of a sulfate or mono- or dihydrogen phosphate anion;

with the proviso that the dye contains at least one group of the vinylsulfone series, such as a group of the formula —$SO_2$—Y with Y as defined above.

Both in the formulae mentioned above and in those below the individual formula members, both with different and with the same designation within a formula, can within the scope of their definition have meanings which are the same as or different from one another.

Fb is preferably the radical of a mono- or disazo dye or the radical of a heavy metal complex azo dye, such as a 1:2 chromium complex, 1:2 cobalt complex and, in particular, an o,o'-1:2 copper complex monoazo or disazo dye or the radical of copper formazan dye, a nickel or copper phthalocyanine dye or triphendioxazine dye.

The dye radical Fb possesses one or more, such as 2 to 6, sulfo groups. The radical Fb may comprise further substituents which are customary in organic dyes. Examples of such substituents are: alkyl groups of 1 to 4 C atoms, such as methyl, ethyl, propyl, isopropyl or butyl, of these preferably ethyl and especially methyl; alkoxy groups of 1 to 4 C atoms, such as methoxy, ethoxy, propoxy, isopropoxy and butoxy, of these preferably ethoxy and especially methoxy; alkanoylamino groups of 2 to 5 C atoms, such as the acetylamino and propionylamino group; unsubstituted or sulfo-, carboxy-, methyl-, ethyl-, methoxy-, ethoxy- and/or chlorine-substituted benzoylamino groups; primary and mono- or disubstituted amino groups, the substituents being, for example, alkyl groups of 1 to 4 C atoms and/or phenyl groups, such as monoalkylamino and dialkylamino groups having 1 to 4 C atoms in the alkyl radical, phenylamino or N-($C_1$–$C_4$-alkyl)-N-phenylamino groups, where the alkyl radicals can also be substituted, for example by phenyl, sulfophenyl, hydroxy, sulfato, sulfo and carboxy and the phenyl groups can also be substituted, such as by chlorine, sulfo, carboxy, methyl and/or methoxy, for example methylamino, ethylamino, propylamino, isopropylamino, butylamino, N,N-di-(β-hydroxyethyl)-amino, N,N-di-(β-sulfatoethyl)amino, sulfobenzylamino, N,N-di-(sulfobenzyl)amino and diethylamino groups and also phenylamino and sulfophenylamino groups; alkoxycarbonyl groups having an alkyl radical of 1 to 4 C atoms, such as methoxycarbonyl and ethoxycarbonyl; alkylsulfonyl groups of 1 to 4 C atoms, such as methylsulfonyl and ethylsulfonyl; trifluoromethyl, nitro and cyano groups; halogen atoms, such as fluorine, chlorine and bromine; carbamoyl groups, which can be mono- and disubstituted by alkyl of 1 to 4 C atoms, it being possible for the alkyl radicals in turn to be substituted, for example by hydroxy, sulfato, sulfo, carboxy, phenyl and sulfophenyl, for example N-methylcarbamoyl and N-ethylcarbamoyl; sulfamoyl groups, which can be mono- or disubstituted by alkyl groups of 1 to 4 C atoms, and N-phenyl-N-alkylsulfamoyl groups having an alkyl group of 1 to 4 C atoms, it being possible for these alkyl groups in turn to be substituted by hydroxy sulfato, sulfo, carboxy, phenyl and sulfophenyl, for example N-methylsulfamoyl, N-ethylsulfamoyl, N-propylsulfamoyl, N-isopropylsulfamoyl, N-butylsulfamoyl, N-(β-hydroxyethyl)sulfamoyl and N,N-di-(β-hydroxyethyl)sulfamoyl; N-phenylsulfamoyl, ureido, hydroxy, carboxy, sulfomethyl and sulfo groups. The dye radical Fb can also have one or two fiber-reactive groups of the formula Y—$SO_2$—$W^{o}$— in which $W^{o}$ is an alkylene radical of 1 to 4 C atoms or an amino group of the formula —N($CH_3$)— or —N($C_2H_5$)— or a group of the formula —($C_2$-$C_4$-alkylene)—NH— or is a direct covalent bond and Y is vinyl or a β-substituted ethyl as defined above, such as β-sulfatoethyl, β-thiosulfatoethyl, β-phosphatoethyl, β-($C_2C_5$-alkanoyloxy)ethyl, such as β-acetyloxyethyl, β-benzoyloxyethyl, β-(sulfobenzoyloxy)ethyl, β-(p-toluenesulfonyloxy)ethyl or β-haloethyl, such as β-bromoethyl or β-chloroethyl, and preferably vinyl and, with particular preference, β-chloroethyl or β-sulfatoethyl.

The groups "sulfo", "thiosulfato", "carboxy", "phosphate" and "sulfato" include both the acid form and the salt form of these groups. Accordingly, sulfo groups are groups of the formula —$SO_3M$, thiosulfato groups are groups of the formula —S—$SO_3M$, carboxy groups are groups of the formula —COOM, phosphate groups are groups of the formula —$OPO_3M_2$ and sulfato groups are groups of the formula —$OSO_3M$, in which M is hydrogen or an alkali metal, such as sodium, potassium or lithium, or the mole equivalent of an alkaline earth metal, such as of calcium, and is preferably hydrogen or an alkali metal.

Preferred dyes according to the general formula (1) are those of the general formulae (1a), (1b), (1c), (1d), (1e) and (1f)

(1a)

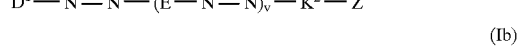

(1b)

(1c)

(1d)

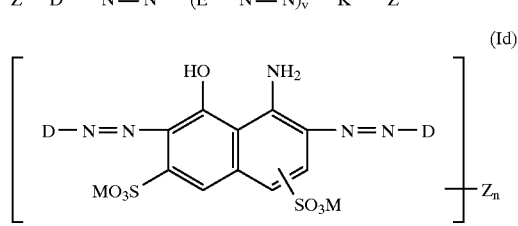

(1e)

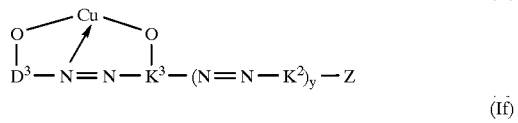

(1f)

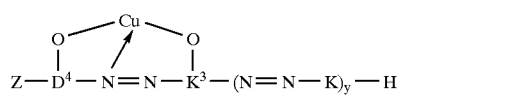

in which:

Z is a group of the general formula (3)

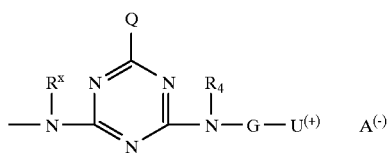
(3)

in which $R^x$, $R_4$, G, $U^{(+)}$, Q und $A^{(-)}$ are defined as above;

$D^1$ is a group of the general formula (4a) or (4b), $D^3$ is a group of the general formula (5a) or (5b) and $D^4$ is a group of the general formula (5c) or (5d)

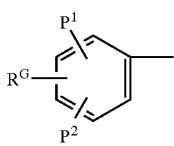
(4a)

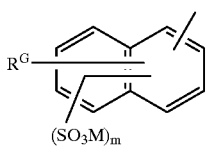
(4b)

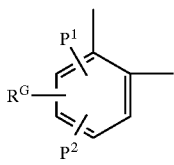
(5a)

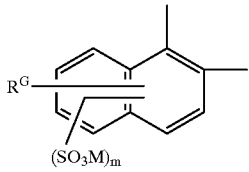
(5b)

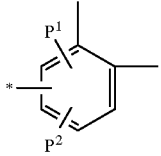
(5c)

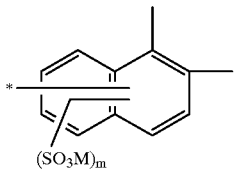
(5d)

in which

M is defined as above, $R^G$ is hydrogen, sulfo or a group of the formula $Y-SO_2-W^o-$ where $W^o$ and Y are as defined above, $P^1$ is hydrogen, methyl, ethyl, methoxy, ethoxy, alkanoyl of 2 to 5 C atoms, such as acetyl and propionyl, cyano, sulfo, carboxy, alkoxycarbonyl of 2 to 5 C atoms, such as methoxycarbonyl and ethoxycarbonyl, carbamoyl, N-($C_1$–$C_4$-alkyl) carbamoyl, fluorine, chlorine, bromine or trifluoromethyl, $P^2$ is hydrogen, methyl, ethyl, methoxy, ethoxy, cyano, nitro, carboxy, sulfo, chlorine, alkanoylamino of 2 to 5 carbon atoms, such as acetylamino, alkoxycarbonyl of 2 to 5 C atoms, such as methoxycarbonyl and ethoxycarbonyl, carbamoyl, N-($C_1$—$C_4$-alkyl) sulfamoyl, sulfophenylamidocarbonyl, phenylamidocarbonyl, alkylsulfonyl of 1 to 4 C atoms, phenylsulfonyl or phenoxy, where the benzene ring in formulae (4a) and (4b) can additionally contain a hydroxy group ortho to the free bond leading to the azo group, the asterisk marks the bond to Z and m is the number zero, 1 or 2 (and if m is zero, this group is hydrogen);

$D^2$ is a group of the general formula (6a) or (6b)

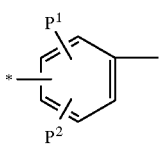
(6a)

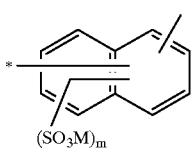
(6b)

in which M, m, $P^1$ and $P^2$ are defined as above, the asterisk marks the bond to Z, and the benzene ring contains ortho to the free bond leading to the azo group a hydroxy group in addition;

D has the meaning of $D^1$ or, if bonded with Z, the meaning of $D^2$;

E is a group of the general formula (7a), (7b) or (7c)

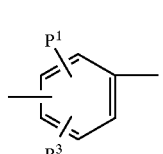
(7a)

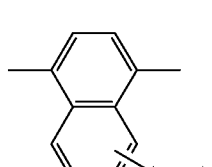
(7b)

(7c)

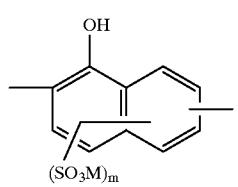

in which

P¹, M and m have the definitions indicated above and

P³ is hydrogen, alkyl of 1 to 4 C atoms, such as methyl or ethyl, alkoxy of 1 to 4 C atoms, such as methoxy and ethoxy, chlorine, alkanoylamino of 2 to 5 C atoms, such as acetylamino and propionylamino, benzoylamino, ureido, phenylureido, alkylureido having 1 to 4 C atoms in the alkyl radical, phenylsulfonyl or alkylsulfonyl of 1 to 4 C atoms;

K¹ is a group of the general formula (8a), (8b), (8c), (8d), (8e), (8f), (8g) or (8h)

(8a)

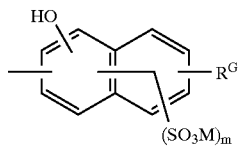

(8b)

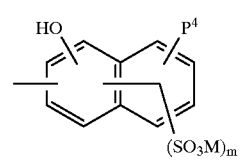

(8c)

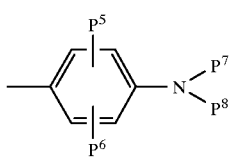

(8d)

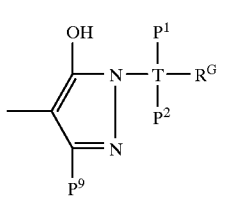

(8e)

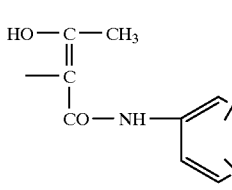

(8f)

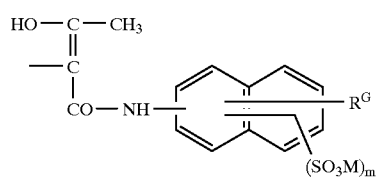

(8g)

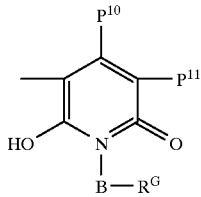

(8h)

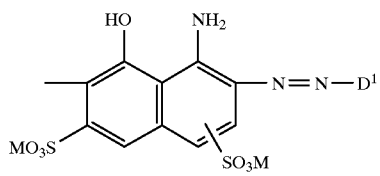

in which $R^G$, $P^1$, $P^2$, m and M have the abovementioned meanings, $P^4$ is alkanoylamino of 2 to 5 C atoms, such as propionylamino and especially acetylamino, or is phenylureido which can be substituted in the phenyl radical by substituents from the group consisting of chlorine, methyl, methoxy, sulfo and carboxy and/or by a group —SO₂—Y where Y has one of the above definitions, or $P^4$ is benzoylamino which can be substituted in the phenyl radical by substituents from the group consisting of chlorine, methyl, methoxy, nitro, sulfo and carboxy and/or by a group —SO₂—Y where Y has one of the above definitions, $P^5$ is hydrogen, alkyl of 1 to 4 C atoms, such as methyl and ethyl, alkoxy of 1 to 4 C atoms, such as methoxy and ethoxy, bromine, chlorine or sulfo, $P^6$ is hydrogen, alkyl of 1 to 4 C atoms, such as methyl and ethyl, alkoxy of 1 to 4 C atoms, such as methoxy and ethoxy, chlorine, alkanoylamino of 2 to 7 C atoms, such as acetylamino and propionylamino, ureido or phenylureido, $P^7$ is hydrogen or alkyl of 1 to 4 C atoms which can be substituted by hydroxy, cyano, carboxy, sulfo, sulfato, methoxycarbonyl, ethoxycarbonyl or acetoxy, $P^8$ is alkyl of 1 to 4 C atoms which can be substituted by hydroxy, cyano, carboxy, sulfo, sulfato, methoxycarbonyl, ethoxycarbonyl or acetoxy, or is benzyl or phenyl, or phenyl which is substituted by alkyl of 1 to 4 C atoms, alkoxy of 1 to 4 C atoms, chlorine and/or sulfo, $P^9$ is hydrogen, alkyl of 1 to 4 C atoms, such as methyl, cyano, carboxy, carboalkoxy of 2 to 5 C atoms, such as carbomethoxy and carboethoxy, carbamoyl or phenyl, preferably methyl, carboxy, methoxycarbonyl, ethoxycarbonyl or phenyl and especially methyl or carboxy, T is a benzene or naphthalene ring, preferably benzene ring, $P^{10}$ is hydrogen or alkyl of 1 to 4 C atoms, such as methyl, or is phenyl or alkyl of 1 to 4 C atoms which is substituted by alkoxy of 1 to 4 C atoms, such as methoxy, or by cyano, and is preferably alkyl of 1 to 4 C atoms or phenyl, $P^{11}$ is hydrogen, chlorine, bromine, sulfo, carbamoyl, methylsulfonyl, phenylsulfonyl, cyano or sulfoalkyl of 1 to 4 C atoms, preferably hydrogen, sulfo, sulfoalkyl having an alkyl radical of 1 to 4 C atoms, such as sulfomethyl, cyano or carbamoyl, B is alkylene of 1 to 4 C atoms, methylenephenylene, ethylenephenylene, phenylenemethylene, phenyleneethylene or phenylene or is phenylene, ethylenephenylene or methylenephenylene which is substituted in the benzene radical by fluorine, chlorine, bromine, methyl, methoxy, cyano, sulfo, carboxy, acetyl, nitro, carbamoyl and/or sulfamoyl, and $D^1$ is a radical of the formula (4a) or (4b);

—$K^2$—Z is a group of the general formula (9a), (9b), (9c), (9d), (9e), (9f), (9g) or (9h)

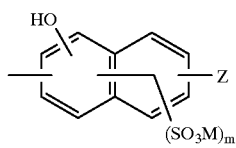
(9a)

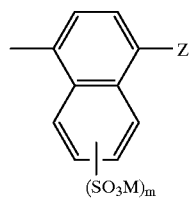
(9b)

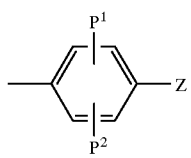
(9c)

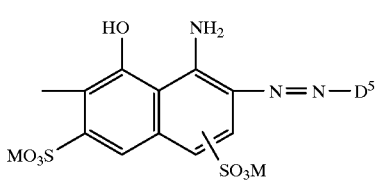
(9d)

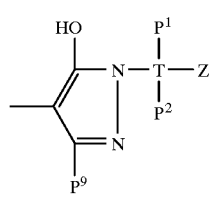
(9e)

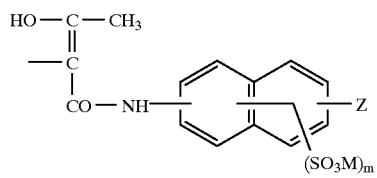
(9f)

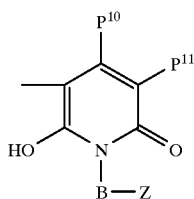
(9g)

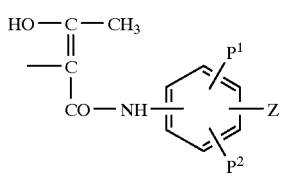
(9h)

in which $P^1$, $P^2$, $P^9$, $P^{10}$, $P^{11}$, B, T, M, m and Z have the definitions indicated above, especially the preferred definitions, and $D^5$ is a radical of the abovementioned and defined formula (6a) or (6b), while in the above formulae (8a), (8b) and (9a) the free bond leading to the azo group being attached to the aromatic nucleus ortho to the hydroxy group;

K has one of the meanings given for $K^1$;

$K^3$ is a group of the general formula (10a), (10b), (10c), (10d) or (10e)

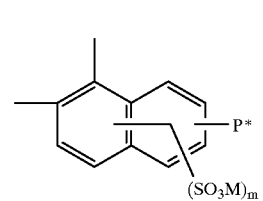
(10a)

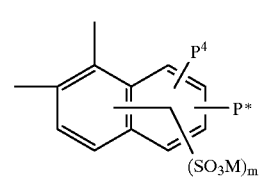
(10b)

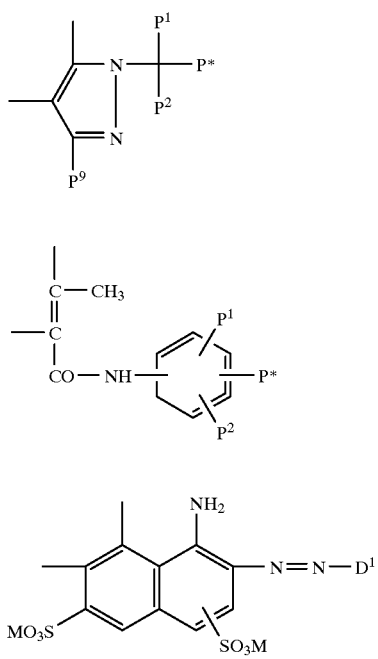

(10c)

(10d)

(10e)

in which the individual formula members have one of the abovementioned meanings and P* is hydrogen or a radical Z or a group of the formula —N=N—K²—Z or —N=N—K—H where K², Z and K have the abovementioned meanings.

The quaternary ammonium group $U^{(-)}$ is preferably selected from the group consisting of a cyclic quaternary salt or a quaternary salt corresponding to the general formula (11)

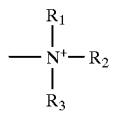

(11)

where $R_1$, $R_2$ and $R_3$ are independently selected from an alkyl group of 1 to 4 carbon atoms, which may be substituted by hydroxy, preferably selected from methyl and ethyl, furthermore selected from the group of the formulae (11a), (11b) and (11c)

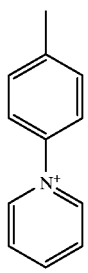

(11a)

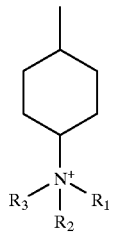

(11b)

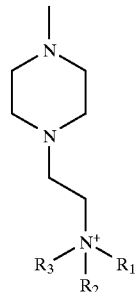

(11c)

wherein $R^o$ is hydroxy, carboxy or carbamoyl.

The dyes of the general formula (1) can be used to engineer a complete line of dyes (or a trichromy) capable of use in low to no salt dyebaths. Preferred dyes thereof are, for ex., dyes of the general formula (12A), (12B), (12C), (12D), (12E), (12F), (12G), (12H) or (12J)

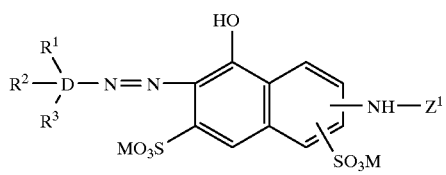

(12A)

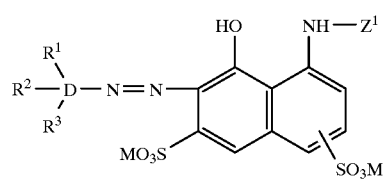

(12B)

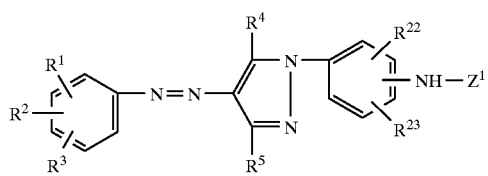

(12C)

-continued

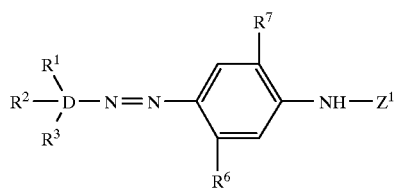
(12D)

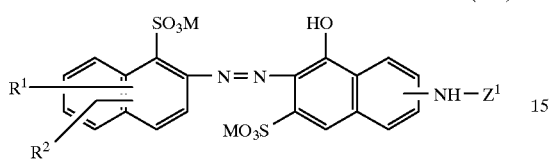
(12E)

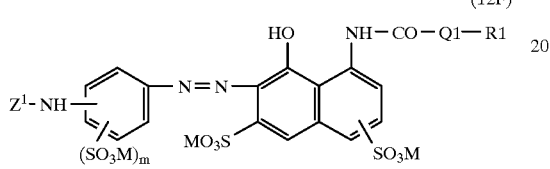
(12F)

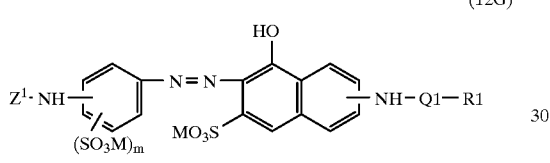
(12G)

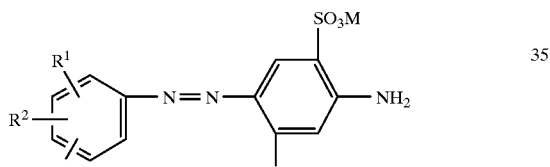
(12H)

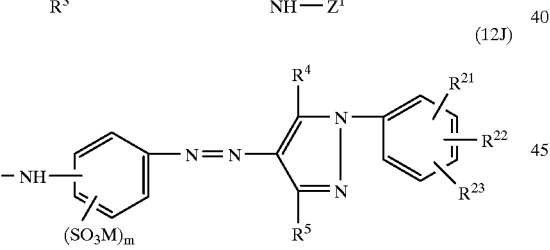
(12J)

in which:
$Z^1$ is a group of the general formula (3A)

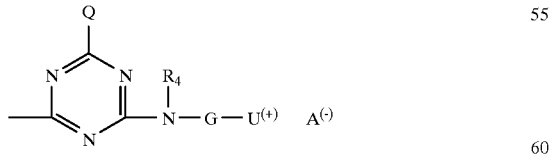
(3A)

in which
Q, $R_4$, G, $U^{(+)}$ and $A^{(-)}$ are defined as above;
M has one of the abovementioned meanings;
D is a benzene ring or is a naphthalene ring where the azo group is attached to the naphthalene ring preferably in the β-position and where, if D is the naphthalene ring, $R^2$ and $R^3$ are preferably each independently of one another a hydrogen atom or a sulfo group;

$R^1$ is hydrogen or sulfo or a group Y—SO$_2$—W°— with the abovementioned meaning;

$R^2$ is hydrogen, alkyl of 1 to 4 C atoms, such as ethyl and especially methyl, alkoxy of 1 to 4 C atoms, such as ethoxy and especially methoxy, halogen, such as chlorine and bromine, carboxy or sulfo and is preferably hydrogen, methyl, methoxy, bromine, chlorine, sulfo or carboxy and, with particular preference, hydrogen, methoxy or sulfo;

$R^3$ is hydrogen, alkyl of 1 to 4 C atoms, such as ethyl and especially methyl, alkoxy of 1 to 4 C atoms, such as ethoxy and especially methoxy, halogen such as chlorine and bromine, nitro, carboxy or sulfo, preferably hydrogen, methyl, methoxy, chlorine, carboxy, sulfo or acetylamino and, with particular preference, hydrogen, methoxy or sulfo;

$R^4$ is hydroxy or amino, preferably hydroxy;

$R^5$ is methyl, carboxy, carbomethoxy or carboethoxy, preferably methyl or carboxy;

$R^6$ is acetylamino, propionylamino, ureido or methyl;

$R^7$ is hydrogen, alkyl of 1 to 4 C atoms, such as methyl and ethyl, alkoxy of 1 to 4 C atoms, such as methoxy and ethoxy, halogen, such as bromine and especially chlorine, preferably hydrogen, methyl, ethyl, methoxy or ethoxy;

$R^8$ is hydrogen or alkyl of 1 to 4 C atoms, such as methyl and ethyl, alkanoylamino of 2 to 5 C atoms, such as acetylamino and propionylamino, or ureido, preferably hydrogen, methyl, ethyl, methoxy, ethoxy, acetylamino or ureido;

$R^{21}$ has one of the meanings of $R^1$;
$R^{22}$ has one of the meanings of $R^2$;
$R^{23}$ has one of the meanings of $R^3$;

$Q^1$ is alkylene of 1 to 4 C atoms, such as ethylene and propylene or is phenylene, or phenylene substituted by sulfo, carboxy and/or alkyl of 1 to 4 C atoms, such as methyl;

m is the number zero, 1 or 2 (and if m is zero this group is hydrogen);

in the compounds of the formulae (12A), (12E) and (12G) the amino or amido group is attached to the 8-naphthol radical in position 2 or 3 and in the compounds of the formulae (12B) and (12F) one group —SO$_3$M is attached to the amino or acylamino group in the meta or para position Of these, preferably $P^1$ is hydrogen, methyl, methoxy, bromine, chlorine, sulfo and carboxy and $P^2$ is hydrogen, methyl, methoxy, chlorine, carboxy, sulfo and acetylamino.

Examples of groups of the formulae (4a) and (4b) are: phenyl, 2-methylphenyl, 3- and 4-methylphenyl, 2-methoxyphenyl, 3- and 4-methoxyphenyl, 2-chlorophenyl, 3- and 4-chlorophenyl, 2,5-dichlorophenyl, 2,5-dimethylphenyl, 2-methoxy-5-methyl-phenyl, 2-methoxy-4-nitrophenyl, 4-phenylphen-1-yl, 3-phenoxyphenyl, 2-sulfamoylphenyl, 3- and 4-sulfamoylphenyl, 2-, 3- and 4-(N-methyl-sulfamoyl)-, -(N-ethylsulfamoyl)-, -(N,N-dimethylsulfamoyl)- and -(N,N-diethylsulfamoyl)phenyl, 2-sulfo-5-trifluormethylphenyl, 2-nitro-phenyl, 3- and 4-nitrophenyl, 3-acetylaminophenyl, 4-acetylamino-phenyl, 2-carboxyphenyl, 4-carboxyphenyl, 3-carboxyphenyl, 3-chloro-6-carboxyphenyl, 2-sulfophenyl, 3-sulfophenyl, 4-sulfophenyl, 2,5-disulfophenyl, 2,4-disulfophenyl, 3,5-disulfophenyl, 2-methyl-5-sulfophenyl, 2-methoxy-5-sulfophenyl, 2-methoxy-4-sulfophenyl, 2-sulfo-5-methylphenyl, 2-methyl-4-sulfophenyl, 3-sulfo-4- methoxy-phenyl, 5-sulfo-2-ethoxyphenyl, 4-sulfo-2-ethoxyphenyl, 2-carboxy-5-sulfophenyl, 2-carboxy-4-sulfophenyl, 2,5-dimethoxy-4-sulfophenyl, 2,4-dimethoxy-5-sulfophenyl, 2-methoxy-5-methyi-4-sulfophenyl, 2-sulfo-4-methoxyphenyl, 2-sulfo-4-methylphenyl, 2-methyl-4-sulfophenyl, 2-chloro-4-sulfophenyl, 2-chloro-5-sulfophenyl, 2-bromo-4-sulfophenyl, 2,6-dichloro-4-sulfophenyl, 2-sulfo-4- and -5-chloro-phenyl, 2-sulfo-4,5-dichlorophenyl, 2,5-dichloro-6-sulfophenyl, 2,5-dichloro-4-sulfophenyl, 2-sulfo-5-chloro-4-methylphenyl, 2-sulfo-4-chloro-5-methylphenyl, 2-sulfo-5-methoxyphenyl, 2-methoxy-5-sulfo-phenyl, 2-methoxy-4-sulfophenyl, 2,4-dimethoxy-6-sulfophenyl, 2-sulfo-5-acetylamino-4-methylphenyl, 2-methyl-4,6-disulfophenyl, 2,5-disulfo-4-methoxyphenyl, 2-sulfo-5-nitrophenyl, 2-sulfo-4-nitrophenyl, 2,6-dimethyl-3-sulfophenyl, 2,6-dimethyl-4-sulfophenyl, 3-acetylamino-6-sulfophenyl, 4-acetylamino-2-sulfophenyl, 4-sulfonaphth-1-yl, 3-sulfo-naphth-1-yl, 5-sulfonaphth-1-yl, 6-sulfonaphth-1-yl, 7-sulfonaphth-1-yl, 8-sulfonaphth-1-yl, 3,6-disulfo- and 5,7-disulfonaphth-1-yl, 3,7-disulfo-naphth-1-yl, 3,6,8-trisulfonaphth-1-yl, 4,6,8-trisulfonaphth-1-yl, 5-sulfonaphth-2-yl, 6- or 8-sulfonaphth-2-yl, 3,6,8-trisulfonaphth-2-yl, 1,5,7-trisulfonaphth-2-yl, 1,7-disulfonaphth-2-yl, 5,7-disulfonaphth-2-yl, 2,5,7-trisulfonaphth-1-yl, 4,6,8-trisulfonaphth-2-yl, 6,8-disulfo-naphth-2-yl, 1,6-disulfonaphth-2-yl, 1-sulfonaphth-2-yl, 1,5-disulfo-naphth-2-yl, 3,6-disulfonaphth-2-yl, 4,8-disulfonaphth-2-yl, 2-hydroxy-5-sulfophenyl, 2-hydroxy-4-sulfophenyl, 2-hydroxy-3,5-disulfophenyl, 2-hydroxy-5-acetylamino-3-sulfophenyl, 2-hydroxy-3-acetylamino-4-sulfophenyl, 2-hydroxy-5-chloro-4-sulfophenyl, 2-hydroxy-5-methylsulfonylphenyl, 2-hydroxy-6-nitro-4-sulfonaphth-1-yl and 1-hydroxy-4,8-disulfonaphth-2-yl, 2-(β-sulfatoethylsulfonyl)phenyl, 3-(β-sulfatoethylsulfonyl)phenyl, 4-(β-sulfatoethylsulfonyl)phenyl, 2-carboxy-5-(β-sulfatoethylsulfonyl)phenyl, 2-chloro-3-(sulfatoethyisulfonyl)phenyl, 2-chloro-4-(β-sulfatoethyisulfonyl)phenyl, 2-bromo-4-(β-sulfatoethylsulfonyl)phenyl, 4-methoxy-3-(β-sulfatoethylsulfonyl)-phenyl, 4-chloro-3-(β-sulfatoethylsulfonyl)phenyl, 2-ethoxy-4- or -5-(β-sulfatoethylsulfonyl)phenyl, 2-methyl-4-(β-sulfatoethylsulfonyl)-phenyl, 2-methoxy-5- or -4-(β-sulfatoethylsulfonyl)phenyl, 2,4-diethoxy-5-(β-sulfatoethylsulfonyl)phenyl, 2,4-dimethoxy-5-(β-sulfatoethylsulfonyl)phenyl, 2,5-dimethoxy-4-(β-sulfatoethylsulfonyl)phenyl, 2-methoxy-5-methyl-4-(β-sulfatoethylsulfonyl)phenyl, 2- or 3- or 4-(β-thiosulfatoethylsulfonyl)phenyl, 2-methoxy-5-(β-thiosulfatoethylsulfonyl)phenyl, 2-sulfo-4-(β-phosphatoethylsulfonyl)phenyl, 2-sulfo-4-vinylsulfonylphenyl, 2-hydroxy-4- or -5-(β-sulfatoethylsulfonyl)phenyl, 2-chloro-4-or -5-(β-chloroethylsulfonyl)phenyl, 2-hydroxy-5-(β-sulfatoethylsulfonyl)-phenyl, 2-hydroxy-3-sulfo-5-(β-sulfatoethylsulfonyl)phenyl, 3- or 4-(β-acetoxyethylsulfonyl)phenyl, 6-carboxy-1-sulfonaphth-2-yl, 5-(β-sulfatoethylsulfonyl)naphth-2-yl, 6- or 7- or 8-(β-sulfatoethyisulfonyl)naphth-2-yl, 6-(β-sulfatoethylsulfonyl)-1-sulfo-naphth-2-yl, 5-(β-sulfatoethylsulfonyl)-1-sulfonaphth-2-yl, 8-(β-sulfatoethylsulfonyl)-6-sulfonaphth-2-yl, 4-[N-methyl-N-(β-sulfatoethylsulfonyl)]aminophenyl, 3-[N-methyl-N-(β-sulfatoethylsulfonyl)]aminophenyl, 4-[β-(β'-sulfatoethylsulfonyl)-ethyl]phenyl, 3- or 4-[β-(β'-chloroethylsulfonyl)ethylamino]phenyl, 3- or 4-[β-(β'-sulfatoethylsulfonyl)ethylamino]phenyl, 3- or 4-[γ-(β'-chloroethylsulfonyl)propylamino]phenyl, 3- or 4-[γ-(β'-sulfatoethylsulfonyl)-propylamino]phenyl, 3- or 4-[γ-(vinylsulfonyl)-propylamino]phenyl, 4-[β-(β'-sulfatoethylsulfonyl)ethylamino]-2- or -3-sulfophenyl, 4-[β-(β'-chloroethylsulfonyl)ethylamino]-2- or -3-sulfo-phenyl, 4-[γ-(β'-sulfatoethylsulfonyl)-propylamino]-2- or -3-sulfophenyl, 4-[γ-(β'-chlorethylsulfonyl)propylamino]-2- or -3-sulfophenyl, 4-[β-(β'-chloroethylsulfonyl) ethylamino]-2-carboxy-phenyl, 4-[β-(β'-sulfatoethylsulfonyl)ethylamino]-2-carboxyphenyl, 4-[γ-(β'-chloroethylsulfonyl)propylamino]-2-carboxyphenyl and 4-[γ-(β'-sulfatoethylsulfonyl)propylamino]-2-carboxyphenyl.

Groups conforming to the formula radicals D—N=N—E— and D¹—N=N—E— are, for example, 4-(4'-sulfophenyl)azo-2-sulfophenyl, 4-(2',4'-disulfo-phenyl)azo-2-methoxy-5-methylphenyl, 4-(2',5'-disulfophenyl)azo-2-methyl-5-methoxyphenyl, 4-(3',6',8'-trisulfonaphth-2'-yl)azo-3-ureidophenyl, 4-(4',8'-disulfonaphth-2'-yl)azo-3-acetylaminophenyl, 7-(1',5'-disulfonaphth-2'-yl)azo-6-sulfo-8-hydroxynaphth-3-yl and 4-(4'-sulfophenyl)azo-6-sulfonaphth-1-yl, 4-[4'-(β-sulfatoethylsulfonyl)-phenyl]azo-2-methyl-5-methoxyphenyl, 4-[3'-(β'-sulfatoethylsulfonyl)-phenyl]azo-3-methylphenyl, 4-[4'-(β-sulfatoethylsulfonyl)phenyl]azo-3-ureidophenyl, 4-[6'-(β-sulfatoethylsulfonyl)sulfatoethylsulfonyl)phenyl]azo-3-ureidophenyl, 4-[6'-(β-sulfatoethylsulfonyl)-naphth-2'-yl]azo-3-ureido-phenyl, 7-[2'-methoxy-5'-(β-sulfatoethylsulfonyl)phenyl]azo-8-hydroxy-6-sulfonaphth-3-yl, 4-(2',5'-disulfophenyl)azo-6- or -7-sulfonaphth-1-yl, 4-(2',4'-disulfophenyl)azo-6- or -7-sulfonaphth-1-yl, 4-(4',8'-disulfo-naphth-2'-yl)azo-6- or -7-sulfonaphth-1-yl, 4-(3',6',8'-trisulfonaphth-2'-yl)azo-6- or -7-sulfonaphth-1-yl and 4-(4',6',8'-trisulfonaphth-2'-yl)-azo-6- or -7-sulfonaphth-1-yl.

Of the dyes of the general formula (1), also those of the general formulae (13A), (13B) and (13C) should be mentioned as of particular interest.

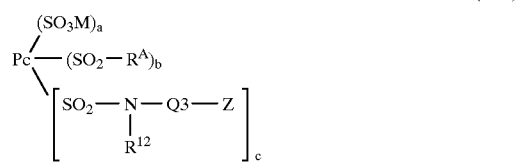

(13A)

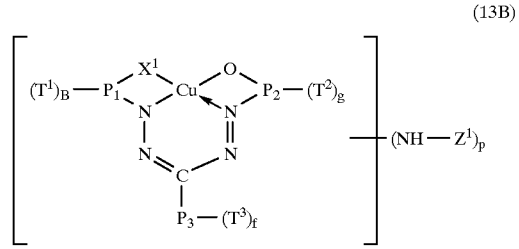

(13B)

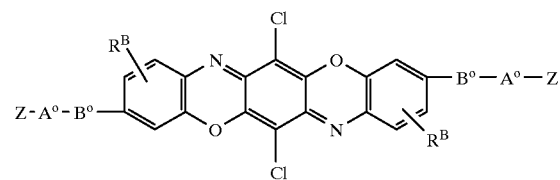

(13C)

in which $P_C$ is the radical of a nickel or, preferably, copper phthalocyanine;

$R_A$ is an amino group of the formula —$NR^{13}R^{14}$ in which $R^{13}$ and $R^{14}$ independently of one another are hydrogen or alkyl of 1 to 4 C atoms which can be substituted by hydroxy or sulfo, or is a heterocyclic, N-containing radical, such as the morpholino or piperidino group;

$R^B$ is sulfo or a group of the formula —$SO_2$—Y defined above;

$R^{12}$ is a hydrogen or alkyl of 1 to 4 C atoms, such as methyl and ethyl;

$Q^3$ is phenylene which can be substituted by 1 or 2 substituents from the group consisting of alkyl of 1 to 4 C atoms, such as ethyl and methyl, halogen, such as chlorine and bromine, carboxy and sulfo, for example sulfophenylene, or is alkylene of 2 to 6 C atoms, such as ethylene;

a is a number from zero to 3, b is a number from zero to 3, and c is a number from 1 to 2, the sum of (a+b+c) being a number from 2 to 4;

$X^1$ is an oxygen atom or, preferably, the carbonyloxy group, of the formula —COO—;

$P_1$ and $P_2$ are, independently of one another, each a benzene or naphthalene ring, the nitrogen atom and the group $X^1$ being attached ortho to one another to $P_1$ and the oxygen atom and the nitrogen atom being attached ortho to one another to $P_2$, and it also being possible for the benzene rings or naphthalene rings to be substituted by one or two substituents from the group consisting of halogen, such as chlorine, nitro, alkyl of 1 to 4 C atoms, such as methyl and ethyl, alkoxy of 1 to 4 C atoms, such as methoxy and ethoxy, sulfamoyl, mono- or di-($C_1$–$C_4$-alkyl)-substituted sulfamoyl, alkylsulfonyl of 1 to 4 C atoms, such as methylsulfonyl and ethylsulfonyl, and phenylsulfonyl, both $P_1$ and $P_2$ preferably being a benzene ring;

$P_3$ is a straight-chain or branched alkylene group of 2 to 6 C atoms, preferably of 2 to 4 C atoms, which can be substituted by a sulfophenyl group, or is a phenylene group or a naphthylene group which can be substituted by 1 or 2 substituents from the group consisting of methyl, ethyl, methoxy, ethoxy and chlorine, $P_3$ preferably being a benzene ring;

$T^1$ is hydrogen, sulfo, carboxy or a group of the formula —$SO_2$—Y defined above, preferably sulfo;

$T^2$ is hydrogen or preferably sulfo or a group of the formula —$SO_2$—Y defined above;

$T^3$ is hydrogen, chlorine or sulfo;

e, f and g are, independently of one another, each the number zero, 1 or 2, preferably 1;

p is the number 1 or 2, preferably 1, where the group —NH-$Z^1$ can be attached to an aromatic radical of $P_1$, $P_2$ or $P_3$ and is preferably attached to $P_2$;

M and Z have one of the abovementioned meanings, $B^o$ is the oxy group —O— or the amino group —NH—;

$A^o$ is alkylene of 2 to 6 C atoms which can be interrupted by 1 or 2 hetero-groups, such as groups of the formulae —O—, —NH—, —NH—CO— and/or —CO—NH—, and/or can be substituted e.g. by hydroxy, sulfo, sulfato or carboxy, or is cyclohexylene, or the group Z—$A^o$—$B^o$— or —$B^o$—$A^o$—Z together is the radical $Z^1$—NH— or —NH—$Z^1$ as defined above, and the two sulfo groups —$SO_3$M are preferably attached to the benzene ring ortho to the oxygen atom of the heterocyclic ring.

Of the dyes of formula (13B), those corresponding to the general formula (13Ba) are preferred (12Wa)

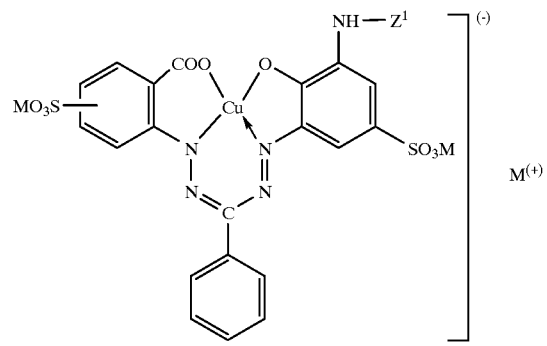

in which $R^B$ and M are defined as above and $R^C$ is sulfo or a group —$SO_2$—Y defined above, with the proviso that $R^B$ and $R^C$ are not both a group —$SO_2$—Y.

A particularly preferred dye of the invention is a dye of the general formula (14)

(14)

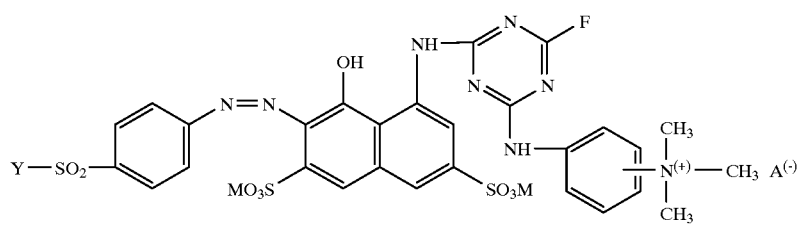

where the quaternary ammonium group is bonded in the meta- or para-position relative to the amino group and M is a hydrogen or an alkali metal and Y has the meaning, in particular preferred meaning, as given above.

The quaternary ammonium substituent of formula (1) may be incorporated into the dye molecule by various methods, e.g. by incorporating into a primary amine which is diazotized in the usual manner and coupled with a benzene or naphthalene coupling component to form the dye molecule or by condensing a quaternary ammonium substituted amine with a halo-s-triazine component of the dye molecule Fb.

However, it will be apparent to the skilled worker that the order of reaction may be modified, for example, the quaternary ammonium substituted amine may first be condensed with a s-halotriazine, followed by a sequential condensation of the Fb-moiety. It will also be apparent to the skilled worker that in the case in which Fb represents an azo dye moiety, the quaternary substituted amine may first be incorporated into the coupling component followed by coupling with a desired diazonium compound to afford an quaternary amine containing dyestuff. The dyes of the invention provide improved color yield, excellent fastness, and are environmentally advantageous in that they may be used with low salt content dyebaths.

Quaternary ammonium compounds can be prepared by various methods. The quaternary ammonium substituent may be incorporated into an aromatic or aliphatic system by alkylation with an alkyl sulfonate (preferably methyl or ethyl sulfate) of an aromatic diamine, where one amine is protected with an acyl group such as acetyl. After the addition of the quaternary ammonium substituent, quaternization, the compound is deprotected (deacylation) and is then incorporated into the fiber-reactive dye molecule through condensation with a 2,4,6-trihalogenated 1,3,5-triazine.

Another method of quaternization involves incorporating the quaternary ammonium group into an aromatic system by alkylation with an alkyl sulfonate (preferably methyl or ethyl sulfate) of a nitroaniline. After quaternization of the amino group, the nitro substituent is reduced by catalytic hydrogenation to an amino group, which may be incorporated into the fiber-reactive dyestuff as mentioned above. In addition to the above methods, exhaustive alkylation may be achieved with an alkyl halide, e.g. methyl or ethyl iodide.

Hydroxalkyl quaternary salts may be produced by exhaustive hydroxyalkylation of a primary amine with ethylene oxide or ethylene carbonate.

It will be apparent to the skilled worker that exhaustive alkylation can be achieved with all of the above described methods by starting with the desired secondary or tertiary amine.

It will also be apparent to the skilled worker that mixed quaternary ammonium salts varying ratios can be produced by any of the above methods by reacting the amine with mixtures of desired alkylating agents, i.e. dimethyl sulfate and diethyl sulfate.

The Examples which follow serve to illustrate the invention. The parts are parts by weight and the percentages are percentages by weight unless stated otherwise. The relationship between parts by weight and parts by volume is that of the kilogram to the liter.

The compounds described by way of formulae in the Examples are indicated in the form of the free acid; in general they are prepared and isolated in the form of their alkali metal salts, such as lithium, sodium or potassium salts, and are used for dyeing in the form of their salts. Similarly, the starting compounds and components stated in the form of the free acid in the subsequent Examples, especially the Tabular Examples, can be employed in the synthesis as they are or in the form of their salts, preferably alkali metal salts.

EXAMPLE A

3-Aminobenzenetrimethylammonium sulfate was prepared by adding 504 parts of dimethyl sulfate to a cold, aqueous solution of 186 parts 3-aminoacetanilide hydrochloride at neutral pH. The product is deacetylated by adding 100 parts of concentrated sulfuric acid and heating at 90 to 100° C. for 24 h. An almost quantitative yield of 3-aminobenzenetrimethylammonium sulfate was obtained. The purity of the product was greater than 95% (by HPLC area).

EXAMPLE B

3-Aminobenzenetriethylammonium sulfate obtained in a manner analogous to the above, except that diethyl sulfate replaced the dimethyl sulfate.

Example 1

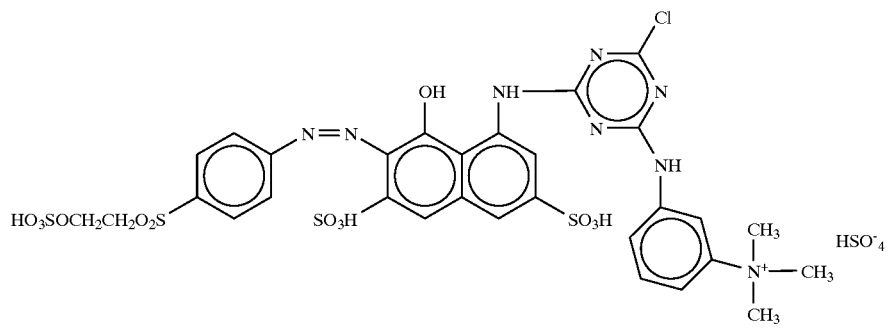

H-acid (62.8 parts) is condensed with a suspension of 36.8 parts cyanuric chloride in water at 0–10° C. and pH 1.5–3.0. Then, 1-aminobenzene-4-(β-sulfatoethyl)-sulfone (55.4 parts) is suspended in dilute, sulfuric acid and diazotized with 34 parts of 40% sodium nitrite at 8–12° C. The mixture is subsequently stirred for one hour and excess nitrous acid is destroyed by means of amidosulfonic acid. This resulting diazonium salt suspension is coupled with the above condensation product of H-acid and cyanuric chloride. The final dyestuff is obtained by condensation of 49.6 parts 3-aminobenzenetrimethyl-ammonium sulfate on the coupling product. The dyestuff is isolated by spray-drying. It has very good dyestuff properties and dyes polyamide fiber materials, such as, in particular, wool, and cellulose fiber materials in clear red shades with very good fastness properties to wet processing, such as, for example, an excellent fastness to washing, as well as high resistance to steam and very good fastness to rubbing, and also very fast in respect of its bleeding onto or soiling adjacent fabric.

Examples 2 to 47

Further azo dyestuffs according to the invention are described in the following Tabular Examples with the aid of the components corresponding to the formula (A).

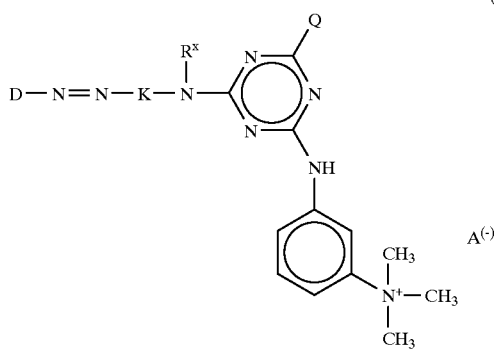

(A)

They can be prepared in the manner according to the invention, for example analogously to the above embodiment, using the components which can be seen from the particular tabular example in association with formula (A) such as diazo component D—$NH_2$, the coupling component H—K—$NR^xH$, a halotriazine, cyanamide and an amine of the formula H—Q. They have very good fiber-reactive dyestuff properties and dye the materials mentioned in the description, in particular cellulose fiber materials, such as cotton, in the shades stated in the particular Tabular Example (cotton for this purpose) with a good depth of color and with good fastness properties.

| Example | Radical-D | Radical-K-N($R^x$)- | Radical Q | Color Shade |
|---|---|---|---|---|
| 2 | 3-(β-sulfatoethylsulfonyl)-phenyl- | 4-hydroxy-2,7-disulfo-3,5-naphthalene-5-amino | Cl | red |
| 3 | 2-methoxy-5-(β-sulfatoethyl-sulfonyl)-phenyl- | 4-hydroxy-2,7-disulfo-3,5-naphthalene-5-amino | Cl | bluish-red |
| 4 | 2-methoxy-5-methyl-4-(β-sulfatoethylsulfonyl)phenyl- | 4-hydroxy-2,7-disulfo-3,5-naphthalene-5-amino | Cl | bluish-red |
| 5 | 2,5-dimethoxy-4-(β-sulfato-ethylsulfonyl)phenyl- | 4-hydroxy-2,7-disulfo-3,5-naphthalene-5-amino | Cl | violet |
| 6 | 2-amino-6-(β-sulfatoethyl-sulfonyl)-naphthalene-1-sulfonic acid | 4-hydroxy-2,7-disulfo-3,5-naphthalene-5-amino | Cl | bluish-red |
| 7 | 2-amino-8-(β-sulfatoethyl-sulfonyl)naphthalene- | 4-hydroxy-2,7-disulfo-3,5-naphthalene-5-amino | Cl | bluish-red |
| 8 | 4-(β-sulfatoethylsulfonyl)phenyl- | 4-hydroxy-2,7-disulfo-3,5-naphthalene-5-amino | F | red |
| 9 | 3-(β-sulfatoethylsulfonyl)phenyl- | 4-hydroxy-2,7-disulfo-3,5-naphthalene-5-amino | F | red |
| 10 | 2-methoxy-5-methyl-4-(β-sulfatoethylsulfonyl)phenyl- | 4-hydroxy-2,7-disulfo-3,5-naphthalene-5-amino | F | bluish-red |
| 11 | 2,5-dimethoxy-4-(2-sulfato-ethylsulfonyl)phenyl- | 4-hydroxy-2,7-disulfo-3,5-naphthalene-5-amino | F | violet |
| 12 | 2-amino-6-(β-sulfatoethyl-sulfonyl)naphthalene-1-sulfonic acid | 4-hydroxy-2,7-disulfo-3,5-naphthalene-5-amino | F | bluish-red |
| 13 | 2-amino-8-(β-sulfatoethyl-sulfonyl)naphthalene- | 4-hydroxy-2,7-disulfo-3,5-naphthalene-5-amino | F | bluish-red |
| 15 | 4-(β-sulfatoethylsulfonyl)phenyl- | 4-hydroxy-2,7-disulfo-3,5-naphthalene-5-amino | NHCN | red |
| 16 | 3-(β-sulfatoethylsulfonyl)phenyl- | 4-hydroxy-2,7-disulfo-3,5-naphthalene-5-amino | NHCN | red |
| 17 | 2-methoxy-5-methyl-4-(β-sulfatoethylsulfonyl)phenyl- | 4-hydroxy-2,7-disulfo-3,5-naphthalene-5-amino | NHCN | bluish-red |
| 18 | 2,5-dimethoxy-4-(β-sulfato-ethylsulfonyl)phenyl- | 4-hydroxy-2,7-disulfo-3,5-naphthalene-5-amino | NHCN | bluish-red |
| 19 | 2-amino-6-(β-sulfatoethylsulfonyl)naphthalene-1-sulfonic acid | 4-hydroxy-2,7-disulfo-3,5-naphthalene-5-amino | NHCN | bluish-red |
| 20 | 2-amino-8-(β-sulfatoethyl-sulfonyl)naphthalene | 4-hydroxy-2,7-disulfo-3,5-naphthalene-5-amino | NHCN | bluish-red |

-continued

| Example | Radical-D | Radical-K-N(R$^x$)- | Radical Q | Color Shade |
|---|---|---|---|---|
| 21 | 4-(2-sulfatoethylsulfonyl)-phenyl- | 4-hydroxy-2,7-disulfo-3,5-naphthalene-5-amino | 4-(β-sulfatoethyl-sulfonyl)phenyl-amino | red |
| 22 | 3-(2-sulfatoethylsulfonyl)phenyl- | | 4-(β-sulfatoethyl-sulfonyl)phenyl-amino | red |
| 23 | 4(2-sulfatoethylsulfonyl)phenyl- | | 3-(sulfatoethyl-sulfonyl) | red |
| 24 | 4-(2-sulfatoethylsulfonyl)phenyl- | | 2-[4-(β-sulfato-ethylsulfonyl)-phen]-ethylamino | red |
| 25 | 4-(2-sulfatoethylsulfonyl)phenyl- | 4-hydroxy-2,7-disulfo-3,5-naphthalene-5-amino | | red |
| 26 | 4-(2-sulfatoethylsulfonyl)phenyl- | 4-hydroxy-2,7-disulfo-3,5-napthalene-5-amino | N-phenyl-N-[2-(β-sulfatoethyl-sulfonyl)-ethyl]-amino | red |
| 27 | 2-sulfophenyl- | 4-hydroxy-2,7-disulfo-3,5-naphthalene-5-amino | 4-(β-sulfatoethyl-sulfonyl)phenyl-amino | yellowish red |
| 28 | 2-sulfophenyl- | 4-hydroxy-2,7-disulfo-3,5-naphthalene-5-amino | 3-(β-sulfatoethyl-sulfonyl)-propylamino | yellowish red |
| 29 | 2-sulfophenyl- | 4-hydroxy-2,7-disulfo-3,5-naphthalene-5-amino | N-phenyl-N-[2-(β-sulfatoethyl-sulfonyl)-ethyl]-amino | yellowish red |
| 30 | 2-sulfophenyl- | 4-hydroxy-2,7-disulfo-3,5-naphthalene-5-amino | N-methyl-3-(β-sulfatoethylsulfonyl)-propylamino | yellowish red |
| 31 | 1,5-disulfonaphth-2-yl | 4-hydroxy-2,7-disulfo-3,5-naphthalene-5-amino | 4-(β-sulfatoethyl-sulfonyl)-phenylamino | bluish red |
| 32 | 1,5-disulfonaphth-2yl | 4-hydroxy-2,7-disulfo-3,5-naphthalene-5-amino | 3-(β-sulfatoethyl-sulfonyl)-propylamino | bluish red |
| 33 | 1,5-disulfonaphth-2yl | 4-hydroxy-2,7-disulfo-3,5-naphthalene-5-amino | N-methyl-3-(β-sulfatoethylsulfonyl)-propylamino | bluish red |
| 34 | 1,5-disulfonaphth-2yl | 4-hydroxy-2,7-disulfo-3,5-naphthalene-5-amino | N-phenyl-N-[2-(β-sulfatoethyl-sulfonyl)-ethyl]-amino | bluish red |
| 35 | 4-(β-sulfatoethylsulfonyl)phenyl | 4-hydroxy-2,8-disulfo-3,5-naphthylene-5-amino | F | yellowish red |
| 36 | 4-(β-sulfatoethylsulfonyl)phenyl | 4-hydroxy-2,8-disulfo-3,5-naphthylene-5-amino | Cl | yellowish red |
| 37 | 4-(2-sulfatoethylsulfonyl)phenyl | 3-amino-4-sulfo-6,1-phenylene-1-amino | NHCN | golden yellow |
| 38 | 4-(β-sulfatoethylsulfonyl)phenyl | 3-amino-4-sulfo-6,1-phenylene-1-amino | Cl | golden yellow |
| 39 | 2-sulfo-4-(β-sulfatoethylsulfonyl)phenyl | 3-amino-4-sulfo-6,1-phenylene-1-amino | NHCN | golden yellow |
| 40 | 2-sulfo-4-(β-sulfatoethylsulfonyl)phenyl | 3-amino-4-sulfo-6,1-phenylene-1-amino | Cl | golden yellow |
| 41 | 4-(β-sulfatoethylsulfonyl)phenyl | 3-amino-4-sulfo-6,1-phenylene-1-amino | F | golden yellow |
| 42 | 1:1 copper complex of: 2-hydroxy-4-(β-sulfatoethyl-sulfonyl)phenyl | 4-hydroxy-2,7-disulfo-3,5-naphthylene-5-amino | Cl | blue |
| 43 | 1:1 copper complex of: 2-hydroxy-4-(β-sulfatoethyl-sulfonyl)phenyl | 4-hydroxy-2,7-disulfo-3,5-naphthylene-5-amino | F | blue |
| 44 | 1:1 copper complex of: 2-hydroxy-4-(β-sulfatoethyl-sulfonyl)phenyl | 4-hydroxy-2,7-disulfo-3,5-naphthalene-5-amino | NHCN | blue |
| 45 | 1:1 copper complex of: 2-hydroxy-5-(β-sulfatoethyl-sulfonyl)phenyl | 4-hydroxy-2,7-disulfo-3,5-naphthalyene-5-amino | Cl | blue |
| 46 | 1:1 copper complex of: 2-hydroxy-5-(β-sulfatoethyl-sulfonyl)phenyl | 4-hydroxy-2,7-disulfo-3,5-naphthylene-5-amino | F | blue |
| 47 | 1:1 copper complex of: 2-hydroxy-5-(β-sulfatoethyl-sulfonyl)phenyl | 4-hydroxy-2,7-disulfo-3,5-naphthylene-5-amino | NHCN | blue |

Example 48 to 92

Further azo dyestuffs according to the invention are described in the following Tabular Examples with the aid of the components corresponding to the formula (B).

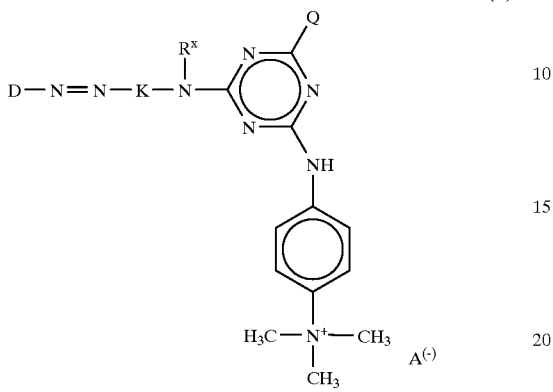

(B)

They can be prepared in the manner according to the invention, for example analogously to the above embodiment, using the components which can be seen from the particular tabular example in association with formula (B) such as diazo component D—NH$_2$, the coupling component H—K—NR$^x$H, a halotriazine, cyanamide and an amine of the formula H—Q. They have very good fiber-reactive dyestuff properties and dye the materials mentioned in the description, in particular cellulose fiber materials, such as cotton, in the shades stated in the particular tabular example (cotton for this purpose) with a good depth of color and with good fastness properties.

| Example | Radical-D | Radical-K-N(R$^x$)- | Radical Q | Color Shade |
|---|---|---|---|---|
| 48 | 3-(β-sulfatoethylsulfonyl)phenyl- | 4-hydroxy-2,7-disulfo-3,5-naphthalene-5-amino | Cl | red |
| 49 | 2-methoxy-5-(β-sulfatoethylsulfonyl)phenyl- | 4-hydroxy-2,7-disulfo-3,5-naphthalene-5-amino | Cl | bluish-red |
| 50 | 2-methoxy-5-methyl-4-(β-sulfato-ethylsulfonyl)phenyl- | 4-hydroxy-2,7-disulfo-3,5-naphthalene-5-amino | Cl | bluish-red |
| 51 | 2,5-dimethoxy-4-(β-sulfato-ethylsulfonyl)phenyl- | 4-hydroxy-2,7-disulfo-3,5-naphthalene-5-amino | Cl | violet |
| 52 | 2-amino-6-(β-sulfatoethylsulfonyl)-naphthalene-1-sulfonic acid | 4-hydroxy-2,7-disulfo-3,5-naphthalene-5-amino | Cl | bluish-red |
| 53 | 2-amino-8-(β-sulfatoethylsulfonyl) naphthalene- | 4-hydroxy-2,7-disulfo-3,5-naphthalene-5-amino | Cl | bluish-red |
| 54 | 4-(β-sulfatoethylsulfonyl)phenyl- | 4-hydroxy-2,7-disulfo-3,5-naphthalene-5-amino | F | red |
| 55 | 3-(β-sulfatoethylsulfonyl)phenyl- | 4-hydroxy-2,7-disulfo-3,5-naphthalene-5-amino | F | red |
| 56 | 2-methoxy-5-methyl-4-(β-sulfatoethylsulfonyl)-phenyl- | 4-hydroxy-2,7-disulfo-3,5-naphthalene-5-amino | F | bluish-red |
| 57 | 2,5-dimethoxy-4-(β-sulfato-ethylsulfonyl)phenyl- | 4-hydroxy-2,7-disulfo-3,5-naphthalene-5-amino | F | violet |
| 58 | 2-amino-6-(β-sulfatoethylsulfonyl) naphthalene-1-sulfonic acid | 4-hydroxy-2,7-disulfo-3,5-naphthalene-5-amino | F | bluish-red |
| 59 | 2-amino-8-(β-sulfatoethylsulfonyl) naphthalene- | 4-hydroxy-2,7-disulfo-3,5-naphthalene-5-amino | F | bluish-red |
| 60 | 4-(β-sulfatoethylsulfonyl)phenyl- | 4-hydroxy-2,7-disulfo-3,5-naphthalene-5-amino | NHCN | red |
| 61 | 3-(β-sulfatoethylsulfonyl)phenyl- | 4-hydroxy-2,7-disulfo-3,5-naphthalene-5-amino | NHCN | red |
| 62 | 2-methoxy-5-methyl-4-(β-sulfatoethylsulfonyl)phenyl- | 4-hydroxy-2,7-disulfo-3,5-naphthalene-5-amino | NHCN | bluish-red |
| 63 | 2,5-dimethoxy-4-(β-sulfato-ethylsulfonyl)phenyl- | 4-hydroxy-2,7-disulfo-3,5-naphthalene-5- | NHCN | bluish-red |

-continued

| Example | Radical-D | Radical-K-N(R$^x$)- | Radical Q | Color Shade |
|---|---|---|---|---|
| 64 | 2-amino-6-(β-sulfatoethylsulfonyl)naphthalene-1-sulfonic acid | 4-hydroxy-2,7-disulfo-3,5-naphthalene-5-amino | NHCN | bluish-red |
| 65 | 2-amino-8-(β-sulfatoethylsulfonyl)naphthalene- | 4-hydroxy-2,7-disulfo-3,5-naphthalene-5-amino | NHCN | bluish-red |
| 66 | 4-(β-sulfatoethylsulfonyl)phenyl- | 4-hydroxy-2,7-disulfo-3,5-naphthalene-5-amino | 4-(β-sulfatoethylsulfonyl)phenyl-amino | red |
| 67 | 3-(β-sulfatoethylsulfonyl)phenyl- | 4-hydroxy-2,7-disulfo-3,5-naphthalene-5-amino | 4-(β-sulfatoethylsulfonyl)phenyl-amino | red |
| 68 | 4-(β-sulfatoethylsulfonyl)phenyl- | 4-hydroxy-2,7-disulfo-3,5-naphthalene-5-amino | 3-(β-sulfatoethylsulfonyl)-propylamino | red |
| 69 | 4-(β-sulfatoethylsulfonyl)phenyl- | 4-hydroxy-2,7-disulfo-3,5-naphthalene-5-amino | 2-[4-(β-sulfato-ethylsulfonyl)-phen]-ethylamino | red |
| 70 | 4-(β-sulfatoethylsulfonyl)phenyl- | 4-hydroxy-2,7-disulfo-3,5-naphthalene-5-amino | N-ethyl-N-[4-(β-sulfatoethyl-sulfonyl)phenyl]-amino | red |
| 71 | 4-(β-sulfatoethylsulfonyl)phenyl- | 4-hydroxy-2,7-disulfo-3,5-naphthalene-5-amino | N-phenyl-N-[2-(β-sulfatoethyl-sulfonyl)-ethyl]-amino | red |
| 72 | 2-sulfophenyl- | 4-hydroxy-2,7-disulfo-3,5-naphthalene-5-amino | 4-(β-sulfatoethylsulfonyl)phenyl-amino | yellowish red |
| 73 | 2-sulfophenyl- | 4-hydroxy-2,7-disulfo-3,5-naphthalene-5-amino | 3-(β-sulfatoethylsulfonyl)-propylamino | yellowish red |
| 74 | 2-sulfophenyl- | 4-hydroxy-2,7-disulfo-3,5-naphthalene-5-amino | N-phenyl-N-[2-(β-sulfatoethyl-sulfonyl)-ethyl]-amino | yellowish red |
| 75 | 2-sulfophenyl- | 4-hydroxy-2,7-disulfo-3,5-naphthalene-5-amino | N-methyl-3-(β-sulfatoethyl-sulfonyl)propyl-amino | yellowish red |
| 76 | 1,5-disulfonaphth-2-yl | 4-hydroxy-2,7-disulfo-3,5-naphthalene-5-amino | 4-(β-sulfatoethyl-sulfonyl)phenyl-amino | bluish red |
| 77 | 1,5-disulfonaphth-2yl | 4-hydroxy-2,7-disulfo-3,5-naphthalene-5-amino | 3-(β-sulfatoethyl-sulfonyl)-propyl-amino | bluish red |
| 78 | 1,5-disulfonaphth-2yl | 4-hydroxy-2,7-disulfo-3,5-naphthalene-5-amino | N-methyl-3-(β-sulfatoethyl-sulfonyl)-propylamino | bluish red |
| 79 | 1,5-disulfonaphth-2yl | 4-hydroxy-2,7-disulfo-3,5-naphthalene-5-amino | N-phenyl-N-[2-(β-sulfatoethyl-sulfonyl)-ethyl]-amino | bluish red |
| 80 | 4-(β-sulfatoethylsulfonyl)phenyl | 4-hydroxy-2,8-disulfo-3,5-naphthylene-5-amino | F | yellowish red |
| 81 | 4-(β-sulfatoethylsulfonyl)phenyl | 4-hydroxy-2,8-disulfo-3,5-naphthylene-5-amino | Cl | yellowish red |
| 82 | 4-(β-sulfatoethylsulfonyl)-phenyl | 3-amino-4-sulfo-6,1-phenylene-1-amino | NHCN | golden yellow |
| 83 | 4-(β-sulfatoethylsulfonyl)phenyl | 3-amino-sulfo-6,1-phenylene-1-amino | Cl | golden yellow |
| 84 | 2-sulfo-4-(β-sulfatoethylsulfonyl)phenyl | 3-amino-4-sulfo-6,1-phenylene-1-amino | NHCN | golden yellow |
| 85 | 2-sulfo-4-(β-sulfatoethylsulfonyl)phenyl | 3-amino-4-sulfo-6,1-phenylene-1-amino | Cl | golden yellow |
| 86 | 4-(β-sulfatoethylsulfonyl)phenyl | 3-amino-4-sulfo-6,1-phenylene-1- | F | golden yellow |

-continued

| Example | Radical-D | Radical-K-N(R$^x$)- | Radical Q | Color Shade |
|---|---|---|---|---|
| 87 | 1:1 copper complex of: 2-hydroxy-4-(β-sulfatoethyl-sulfonyl)phenyl | 4-hydroxy-2,7-disulfo-3,5-naphthylene-5-amino | Cl | blue |
| 88 | 1:1 copper complex of: 2-hydroxy-4-(β-sulfatoethyl-sulfonyl)phenyl | 4-hydroxy-2,7-disulfo-3,5-naphthylene-5-amino | F | blue |
| 89 | 1:1 copper complex of: 2-hydroxy-4-(β-sulfatoethyl-sulfonyl)phenyl | 4-hydroxy-2,7-disulfo-3,5-naphthylene-5-amino | NHCN | blue |
| 90 | 1:1 copper complex of: 2-hydroxy-5-(β-sulfatoethyl-sulfonyl)phenyl | 4-hydroxy-2,7-disulfo-3,5-naphthylene-5-amino | Cl | blue |
| 91 | 1:1 copper complex of: 2-hydroxy-5-(β-sulfatoethyl-sulfonyl)phenyl | 4-hydroxy-2,7-disulfo-3,5-naphthylene-5-amino | F | blue |
| 92 | 1:1 copper complex of: 2-hydroxy-5-(β-sulfatoethyl-sulfonyl)phenyl | 4-hydroxy-2,7-disulfo-3,5-naphthylene-5-amino | NHCN | blue |

Example 93

116 parts by volume of a 21% 3-aminobenzenetrimethyiammonium sulfate are reacted in an aqueous solution with 18.4 parts of cyanuric chloride at 0–10° C. and pH of 2.0–4.0. 18.8 parts of 1,3-diaminobenzed-4-sulfonic acid are then added at a pH of 4.0–5.0. The pH is then brought to 1.0 by means of aqueous hydrochloric acid and is cooled to 0–10° C. with ice. The mixture is diazotized with 17.8 parts of a 38% sodium nitrite solution. The resulting diazonium solution is then added to an aqueous solution of 36.2 parts 1-[4'-(γ-sulfatoethylsulfonyl)phenyl]-3-methylpyrazol-5-one. The coupling reaction is carried out at 15–25° C. and at a pH of 4.5–5.0. The solution is clarified and filtered. The filtrate is evaporated. A yellow powder of the formula is obtained. It has very good fiber-reactive dyestuff properties and dyes cotton, for example, in greenish-yellow shades.

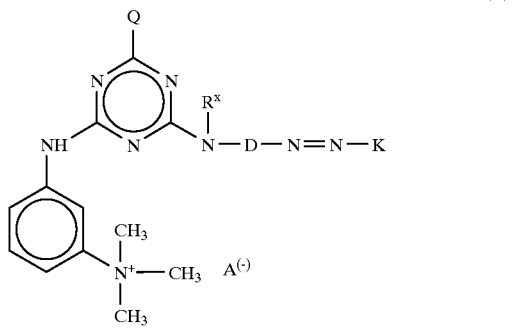

(C)

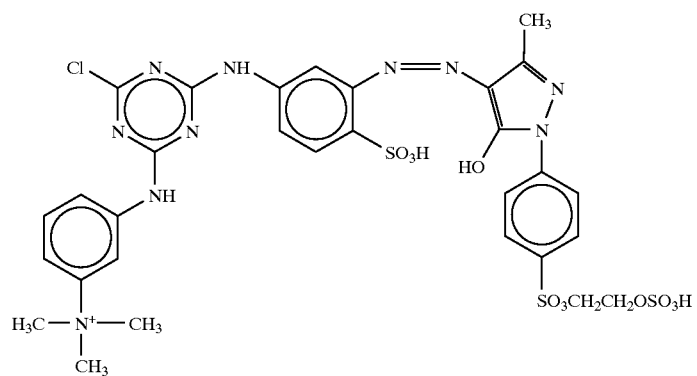

Example 94 to 97

Further azo dyestuffs according to the invention are described in the following tabular examples with the aid of the components corresponding to the formula (C).

They can be prepared in the manner according to the invention, for example analogously to the above embodiment, using components which can be seen from the particular tabular example in association with the formula (C) (such as a diaminophenylene or -naphthylene of the formula HR$^x$N—D—NH$_2$ the coupling component H—K, a halotriazine, cyanamide and an amine of the formula H—Q). They have very fiber-reactive dyestuff properties, with a good depth of color and with good fastness.

| Example | Radical-Q | Radical-D | Radical-K | Color Shade |
|---|---|---|---|---|
| 98 | NHCN | ![dimethylbenzene-SO3H] | 1-[4'-(β-sulfatoethyl-sulfonyl)phenyl]-3-methyl-pyrazol-5-on-4-yl | greenish-yellow |
| 99 | Cl | 4,6-disulfo-1,3-phenylene | 1-[4'-(β-sulfatoethyl-sulfonyl)phenyl]-3-methyl-pyrazol-5-on-4-yl | greenish-yellow |
| 100 | F | ![dimethylbenzene-SO3H] | 1-[4'-(β-sulfatoethyl-sulfonyl)phenyl]-3-methyl-pyrazol-5-on-4-yl | greenish-yellow |
| 101 | F | 4,6-disulfo-1,3-phenylene | 1-[4'-(β-sulfatoethyl-sulfonyl)phenyl]-3-methyl-pyrazol-5-on-4-yl | greenish-yellow |
| 102 | F | " | 1-[4'-(β-sulfatoethyl-sulfonyl)phenyl]-3-methyl-pyrazol-5-on-4-yl | greenish-yellow |
| 103 | Cl | 4,6-disulfo-1,3-phenylene | 1-[4'-(β-sulfatoethyl-sulfonyl)phenyl]-3-methyl-pyrazol-5-on-4-yl | greenish-yellow |
| 104 | F | " | 1-[4'-(β-sulfatoethyl-sulfonyl)phenyl]-3-methyl-pyrazol-5-on-4-yl | greenish-yellow |
| 105 | F | ![dimethylbenzene-SO3H] | 4-hydroxy-5-acetyl-amino-2,7-disulfo-naphth-3-yl | yellowish-red |
| 106 | Cl | " | 4-hydroxy-5-acetyl-amino-2,7-disulfo-naphth-3-yl | yellowish-red |

What is claimed:
1. A dye of the general formula (1)

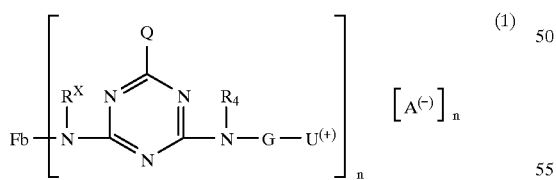

in which:
Fb is the radical of an azo dye, of a heavy metal complex azo dye, of a formazan dye, of a triphenodioxazine dye or of a phthalocyanine dye;
n is 1 or 2;
$R^x$ is hydrogen, alkyl of 1 to 4 carbon atoms, unsubstituted or substituted by halogen, hydroxy, cyano, alkoxy of 1 to 4 carbon atoms, alkoxycarbonyl of 2 to 5 carbon atoms, carboxy, sulfamoyl, sulfo or sulfato;
$R_4$ has one of the meanings of $R^x$;
G is an aromatic, acyclic aliphatic or an alicyclic ($C_3$–$C_6$) group, where each group may have a carbon chain which for any of these groups the chain may be interrupted by one or more hetero groups;
$U^{(+)}$ is a permanent quaternary ammonium group;
Q is fluorine, chlorine, bromine, cyanoamino, pyridino, carboxypyridino, carbamoylpyridino or a group of the general formula (2a) or (2b)

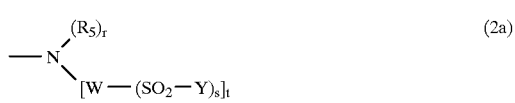

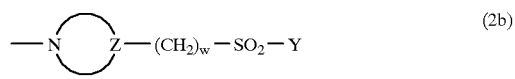

in which
$R_5$ is hydrogen, alkyl of 1 to 4 carbon atoms, alkoxy of 1 to 4 carbon atoms, phenyl or cyclohexyl,
W is substituted or unsubstituted arylene, alkylene or alkylene-arylene, optionally interrupted by a hetero group, Y is vinyl, or is ethyl substituted in the β-position by a substituent which is eliminated by the action of an alkaline agent, Z is nitrogen or CH and forms together with the N atom a bivalent ring consisting of 1 or 2 alkylene groups having 1 to 5 carbons and optionally 1 to 2 hetero groups, r is zero or 1, s is 1 or 2, t is 1 or 2, and w is 1,2 or 3;

A(-) is a colorless anion, with the proviso that the dye contains at least one group of the formula —$SO_2$—Y with Y as defined above.

2. A dye as claimed in claim 1, wherein $U^{(+)}$ $A^{(-)}$ is selected from the group consisting of: a cyclic quaternary salt; or a quaternary salt comprising:

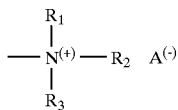

wherein $R_1$, $R_2$ and $R_3$ are independently selected from alkyl having from 1 to 4 carbon atoms, optionally substituted by hydroxy, and $A^{(-)}$ is a colorless anion.

3. A dye as claimed in claim 1, wherein $U^{(+)}$ $A^{(-)}$ is a group of the formula

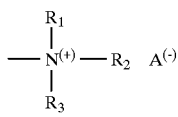

in which $R_1$, $R_2$ and $R_3$ are each, different from another or having the same meaning, alkyl of 1 to 4 carbon atoms, unsubstituted or substituted by hydroxy, and $A^{(-)}$ is a colorless anion.

4. A dye as claimed in claim 3, wherein $R_1$, $R_2$ and $R_3$ are independently selected from methyl and ethyl.

5. A dye as claimed in claim 1, wherein G is an acyclic aliphatic radical where the chain may be interrupted by one or more hetero groups.

6. A dye as claimed in claim 1, wherein G is phenylene unsubstituted or substituted by sulfo, methyl, ethyl, methoxy or ethoxy, or is an acyclic aliphatic group of 1 to 6 carbon atoms or an alicyclic group of 5 to 8 carbon atoms, wherein the alkylene chains of these groups may be interrupted by one or more hetero groups selected from O, S, NH, $SO_2$, CO, CO—NH or NH—CO.

7. A dye as claimed in claim 1, wherein W is unsubstituted or substituted phenylene or unsubstituted or substituted naphthylene, the substituents of phenylene being 1 or 2 substituents selected from the group consisting of alkyl of 1 to 4 carbon atoms, alkoxy of 1 to 4 carbon atoms, carboxy, sulfo and chlorine, and the substituents of naphthylene being 1 or 2 sulfo groups, and the alkylene moieties being those of 1 to 6 carbon atoms.

8. A dye as claimed in claim 1 of the formula

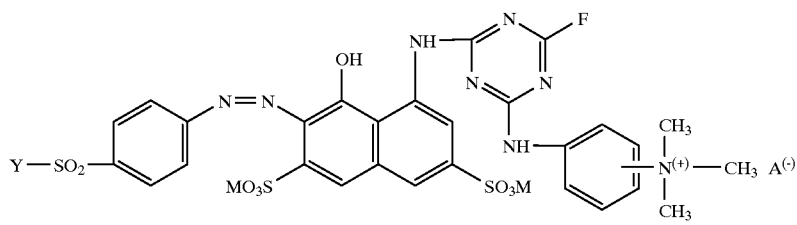

in which Y is defined as in claim 1, the quaternary ammonium group is bonded in the meta- or para-position relative to the amino group, M is a hydrogen or an alkali metal and $A^{(-)}$ is a colorless anion.

9. A dye as claimed in claim 1, wherein Y is vinyl, or is ethyl substituted in the β-position by chlorine, bromine, sulfato, thiosulfato, phosphate, alkanoyloxy of 2 to 5 carbon atoms, benzoyloxy, sulfobenzoyloxy or p-toluenesulfonyloxy.

10. A dye as claimed in claim 1, wherein Y is vinyl, β-sulfatoethyl or β-chloroethyl.

11. A dye as claimed in claim 1, wherein Y is vinyl or β-sulfatoethyl.

12. A dye as claimed in claim 8, wherein Y is vinyl, β-sulfatoethyl or β-chloroethyl.

13. A dye as claimed in claim 8, wherein Y is vinyl or β-sulfatoethyl.

14. A dye as claimed in claim 8, wherein Y is vinyl.

15. A dye as claimed in claim 8, wherein Y is β-sulfatoethyl.

16. A dye as claimed in claim 1, wherein n is 1.

* * * * *